SELF LOADING TRANSPORT

Filed Dec. 26, 1962 14 Sheets-Sheet 1

July 27, 1965 D. I. HAYES 3,197,048

SELF LOADING TRANSPORT

Filed Dec. 26, 1962 14 Sheets-Sheet 2

July 27, 1965 D. I. HAYES 3,197,048

SELF LOADING TRANSPORT

Filed Dec. 26, 1962 14 Sheets-Sheet 7

July 27, 1965 D. I. HAYES 3,197,048

SELF LOADING TRANSPORT

Filed Dec. 26, 1962 14 Sheets-Sheet 8

July 27, 1965 D. I. HAYES 3,197,048

SELF LOADING TRANSPORT

Filed Dec. 26, 1962 14 Sheets-Sheet 11

SELF LOADING TRANSPORT 3,197,048
Patented July 27, 1965

3,197,048

SELF LOADING TRANSPORT

Dale I. Hayes, deceased, late of Salt Lake City, Utah, by Edna Caswell Hayes, executrix, Spokane, Wash., assignor to American Zinc, Lead and Smelting Company, St. Louis, Mo., a corporation of Maine Filed Dec. 26, 1962, Ser. No. 247,402
8 Claims. (Cl. 214—78)

The present invention relates to self-loading transports having the general construction of a body open at the front with upright side walls, and a rear wall and bottom wall structure provided with a dump opening and a closure for this opening, the loading mechanism being an intermediate fold-back hinged at its lower rear edge to the bottom wall and a digging bucket arrangement hinged to the front edge of the trough and comprising bottom and side walls with arms pivoted on the bucket side walls and extending upward toward the top of the body side walls, and connected at their upper ends to power means whereby the bucket can be brought upwardly and rearwardly and the trough can also be brought upwardly and rearwardly to fill the body with aggregate. Such a machine is illustrated in the prior U.S. Patent No. 2,953,263.

It is the purpose of this invention to provide a self-loading transport of the character described above with certain improvements which act to limit the height to which the lip of the bucket can rise under any conditions of loading to substantially the height of the side walls and which act to improve the loading movements so that the intermediate fold-back trough is positively held down while loading it and yet can be then lifted to transport the load thereon rearwardly into the body without forcing the bucket lip above the sidewall height.

Specifically, it is a purpose of this invention to provide the self-loading transport assembly hereinbefore described with a positive but releasable stop means operable to hold the intermediate fold-back in lowered position temporarily while it is being filled by manipulation of the bucket.

Further it is a purpose of this invention to provide the self-loading transport with a link interposed between the trough and the bucket and hinged to both of them with cooperating members on the body and the trough restricting the movements of said link relative to the trough and additional means on the bucket and the link limiting the pivotal movement of the bucket with respect to the link whereby to prevent acute internal angles between the bucket and link and between the link and the trough.

Another object of the invention is to provide a novel hold-down mechanism in the body operable to engage the bucket in its rearward and forward movements and to prevent the bucket lip from rising inadvertently beyond a predetermined level substantially even with the highest parts of the side walls of the body.

It is also a purpose of this invention to provide a self-loading transport of the character described above with a novel means for controlling a bottom dump gate for positive opening and closing and additional safety securing means for keeping the gate closed.

The nature and advantages of the invention will appear more fully from the following description and the accompanying drawings illustrating the invention. The drawings and description are illustrative of a preferred embodiment of the invention, but various modifications may be made in the several parts shown within the scope of the invention as defined by the claims.

In the drawings:

FIGURE 1 and FIGURE 2 together show a side view of the machine, FIGURE 1 showing the front portion and FIGURE 2 the rear portion;

Figures 1, 2:
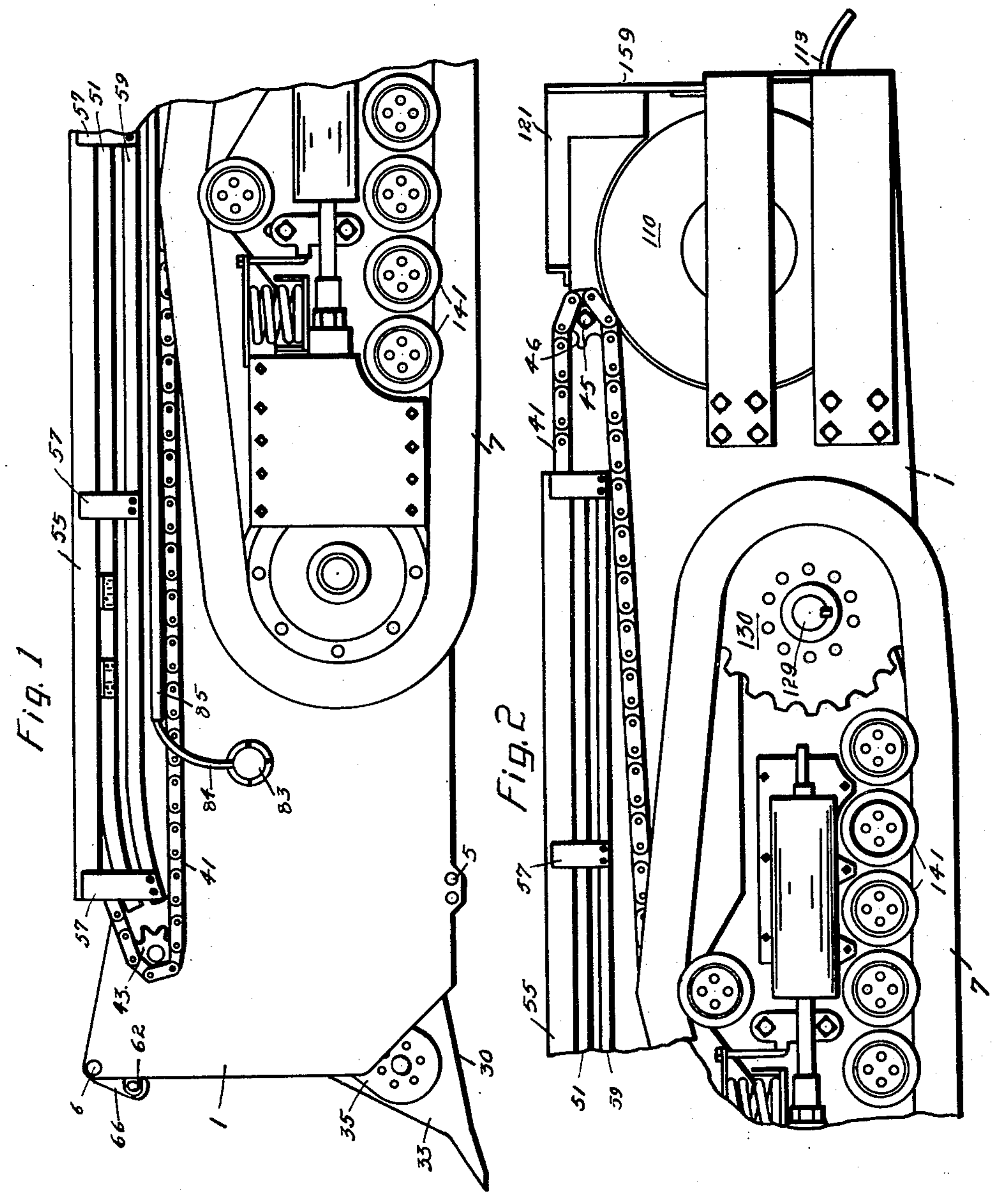

The present invention is directed to providing a self-powered, self-loading transport that is particularly adapted for use in mucking out materials in mines where the tunnels are for one reason or another limited to low head room. In some such underground excavations, the nature of the earth is such that extreme care must be taken to avoid the cave-in of the overhead materials. In others, for example exploratory tunnels, it is not economical to make large, high-ceiling tunnels. In all such operations it is imperative that the transport have substantial load capacity and that it be so constructed that the digging bucket cannot be swung upward by careless or accidental operation against the roof of the tunnel.

According to the present invention the objectives of high load capacity and low head room are obtained by providing a machine wherein the body of the machine is made up of two opposed, spaced-apart side walls 1 and 2. These walls of steel plate are connected at the rear of the load receiving portion by a partition wall 3 of steel plate. The side walls 1 and 2 extend rearwardly from the wall 3 and provide support for the mounting of the driving mechanism of the transport which will be described later. Forwardly from the wall 3 the side walls are connected by a rear lower crosstie member 4, a forward lower crosstie member 5 and a forward upper crosstie member 6. These crosstie members with the wall 3 serve to hold the side walls 1 and 2 in spaced parallel relation. The side walls 1 and 2 have crawler tracks 7 and 8 mounted thereon for supporting the machine and transporting it.

The loading and unloading mechanism of the transport includes a rear bottom closure 9 which extends from side wall 1 to side wall 2 and is movably supported on these walls and which normally closes the space between the side walls rearwardly of the crosstie member 4 to the wall 3. When drawn rearwardly under the wall 3 the closure 9 leaves a dump opening through which material loaded in the body can be discharged downwardly. When drawn forwardly to the crosstie member 4, the closure 9 provides bottom support for the material loaded into the space between the side walls 1 and 2.

Forwardly of the crosstie member 4 and pivoted thereon is an intermediate fold-back trough 10. This trough has its bottom wall 11 provided with a sleeve 12 along the rear edge. This sleeve receives the member 4 to hinge the trough for up and down movement. The trough has side walls 13 and 14 extending up inside the side walls 1 and 2 and increasing in height forwardly from the sleeve 12. The side walls 1 and 2 have stop lugs 15 thereon spaced forwardly from the crosstie member 4 about two thirds of the length of the trough 10, and the side walls 13 and 14 are cut away at their bottom edges at 16 to seat on the stop lugs 15 and limit the downward swinging movement of the trough 10. The trough 10 is adapted to swing upwardly and rearwardly to crowd material thereon back into the space between the side walls in front of the wall 3. Except when it is being manipulated for this purpose, the trough 10 should lie down upon lugs 15. To assure this, a pair of retractable stops 17 and 18 are positioned to engage notches 19 and 20 in the upper forward corners of the side walls 13 and 14. The details of the mechanism for retracting the stops 17 and 18 will be described later herein.

The trough 10 has a link plate 21 hinged to its forward end. There is a hinge rod 22 secured in the side walls 13 and 14 which project forward slightly beyond the bottom wall 11 of the trough 10. A sleeve 23 forming part of the link plate 21 receives the rod 22 to form the hinge connection of the link 21. The link plate is curved as shown, and it has at its ends upstanding flanges 24 and 25 that slide along the inside surfaces of the side walls 13 and 14 of the trough 10.

The side walls 1 and 2 have liner plates 26 and 27 that are cut to match the arcuate forward edges of the side walls 13 and 14 and are of the same thickness as the side walls 13 and 14. When the link plate 21 is in its lowermost position, the flanges 24 and 25 are in juxtaposition to the liner plates 26 and 27.

The link plate has hinge sleeves 28 welded to its front edge, and these sleeves carry a hinge rod 29 for hinging a digging bucket 30 to the plate 21. The sleeves 28 also have stop lugs 31 thereon for limiting the downward swinging of the bucket 30. The bucket 30 has sleeves 32 that encircle the rod 29 between the sleeves 28 to complete the pivotal attachment of the bucket 30 to the link plate 21. The bucket 30 has side walls 33 and 34. These side walls are directly in line with the flanges 24 and 25 so they will slide between the liner plates 27 and 26.

Figure 3:
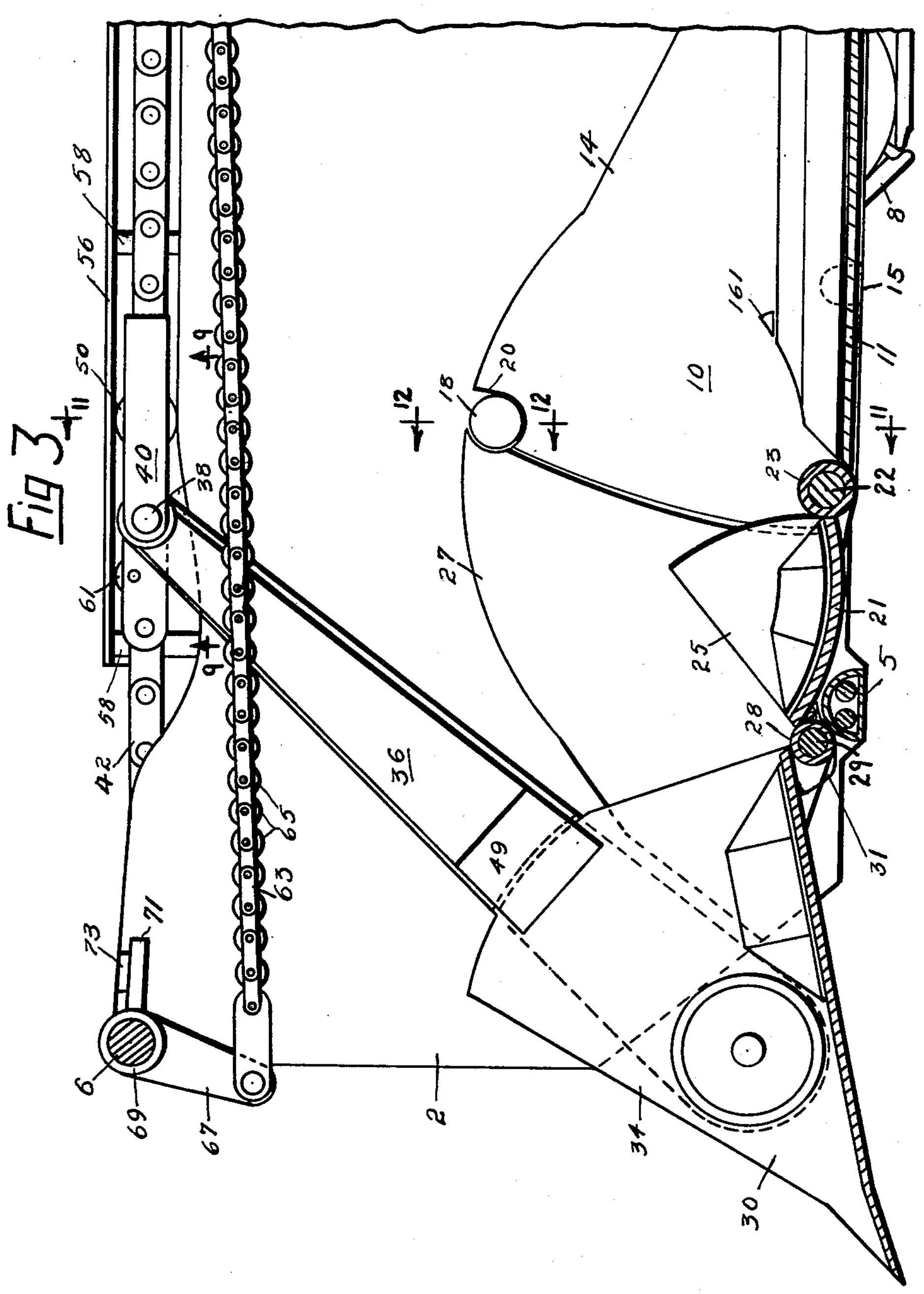
FIGURE 3 is an enlarged fragmentary sectional view taken on a longitudinal vertical plane through the front portion of the machine.
Figure 4:
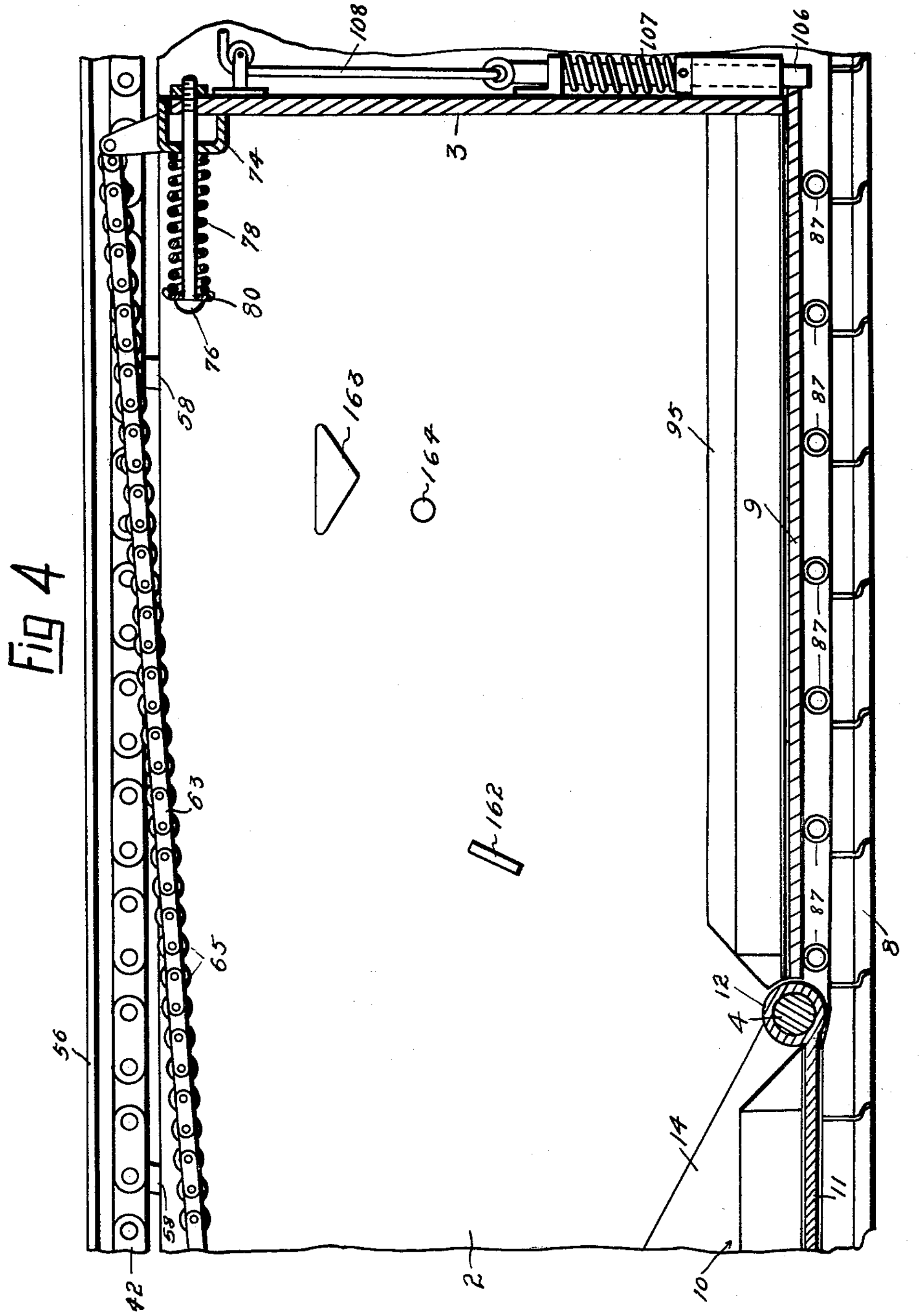
FIGURE 4 is a view like FIGURE 3 showing the rear part of the load-receiving portion of the machine.
Figure 5:
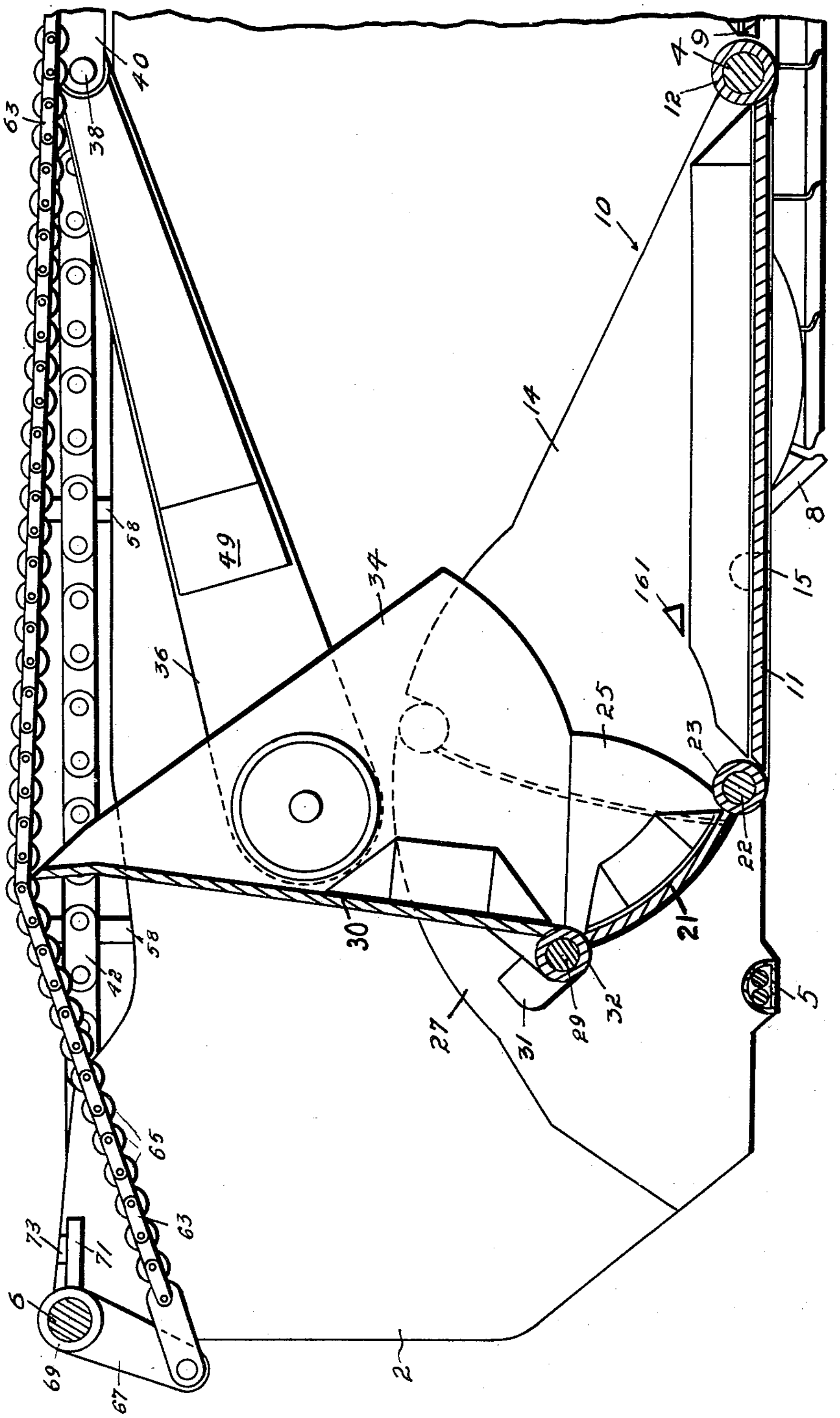
FIGURE 5 is a view taken on the same plane as FIGURE 3 but with the bucket raised to upright position.
Figure 6:
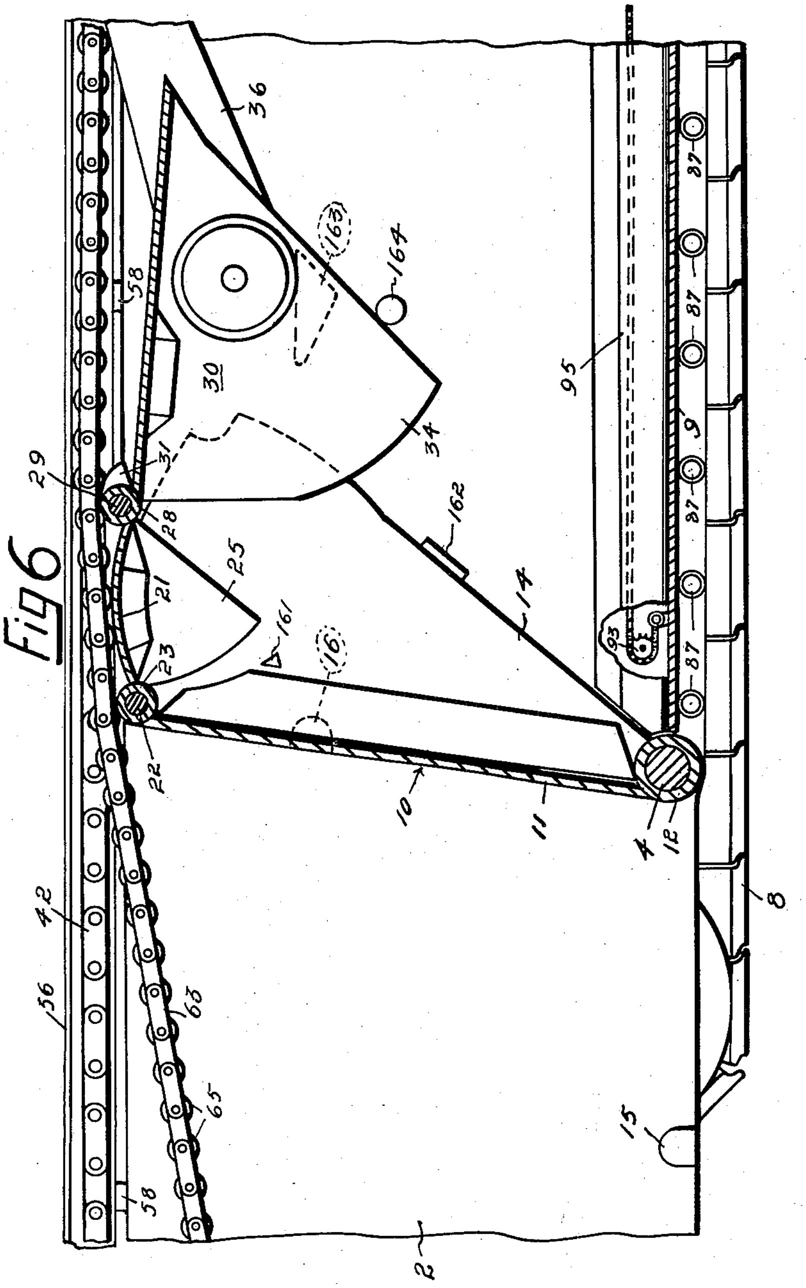
FIGURE 6 is a view taken on the same plane as FIGURE 3 but showing the bucket and associated parts in their rearmost positions.
Figure 7:
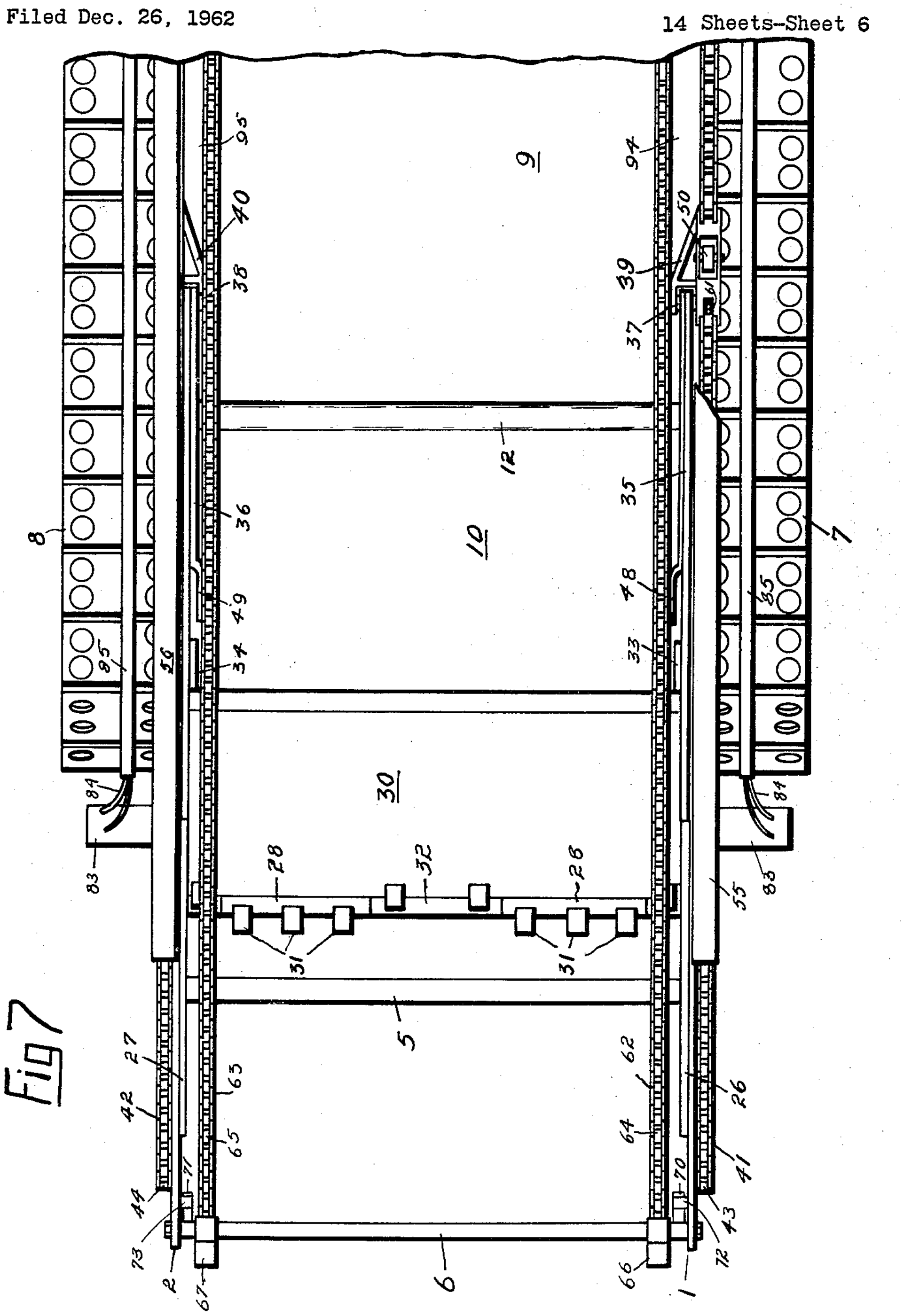
FIGURE 7 is a top plan view of the front portion of the machine with the bucket raised and partly folded over.
Figure 8:
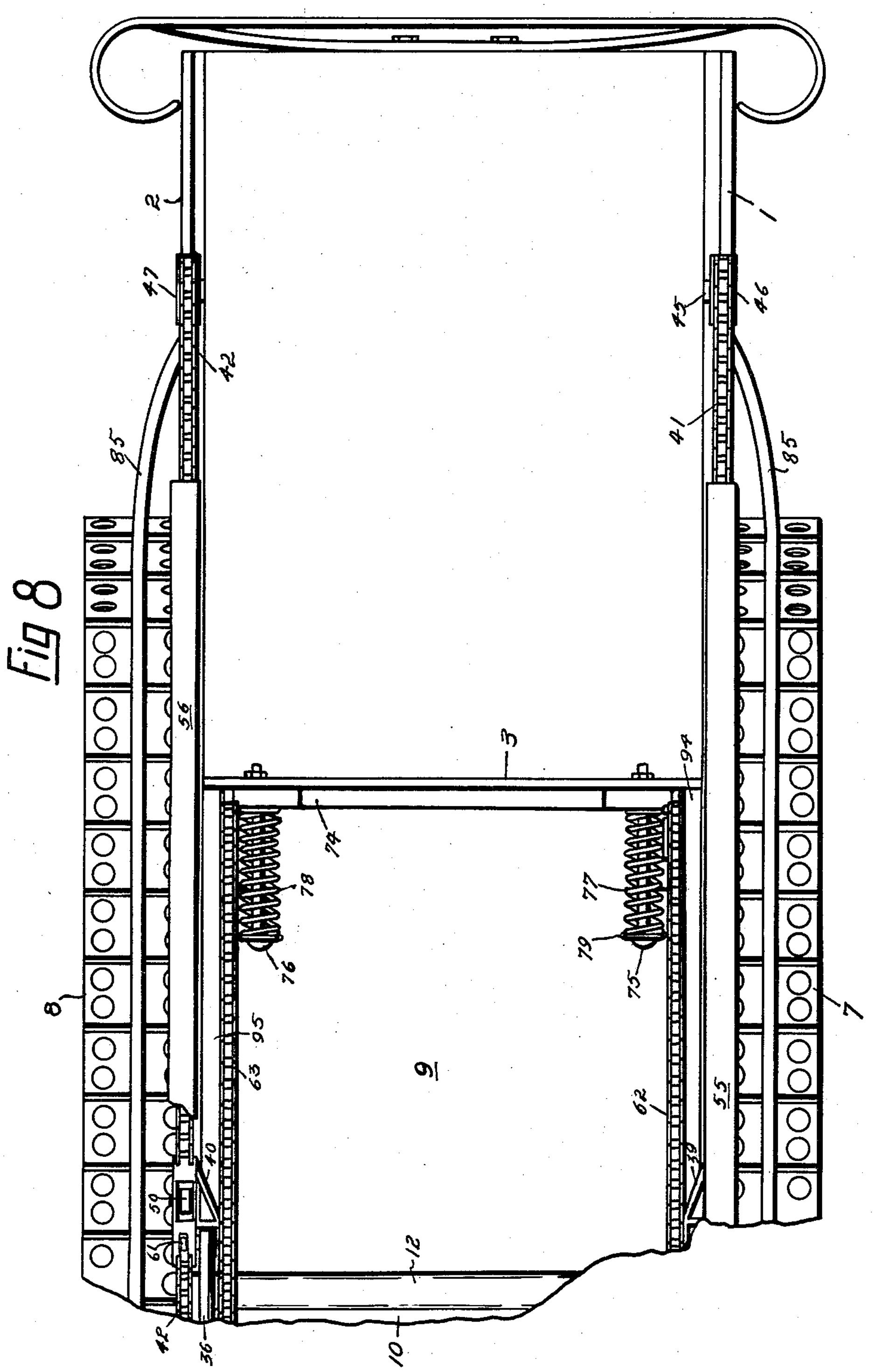
FIGURE 8 is a plan view of the rear half of the machine.

The bucket 30 and the link plate 21 are limited in their downward swinging movement by the crosstie member 5. In order to fill the transport body with the aggregate to be moved, the operator moves the machine forward with the bucket 30, the link plate 21 and the trough 10 in their lowered positions shoving the aggregate into the bucket. He then lifts the bucket and rolls the aggregate back on to the link plate 21 and the trough 10 and repeats this operation with some lifting of the link plate until the load on the trough 10 necessitates lifting this trough to advance the load further into the body of the machine. FIGURES 3 and 5 show two positions of the bucket and the link plate illustrating this operation. When the trough 10 is to be lifted, the retractable stops 17 and 18 are withdrawn and then the bucket 30 is pulled rearwardly from the position shown in FIGURE 5 toward the position shown in FIGURE 6 forcing the trough 10 to rise and crowding the aggregate rearwardly over the closure 9. The position shown in FIGURE 6 is the extreme rearward position that may be taken by the bucket 30, the link plate 21 and the trough 10. When the parts reach this position, the shovel is then pushed forwardly to return them to digging position.

The mechanism will now be described for accomplishing the movements of the parts just described in such a manner as to prevent the bucket lip or the link plate from rising too high.

Figure 9:
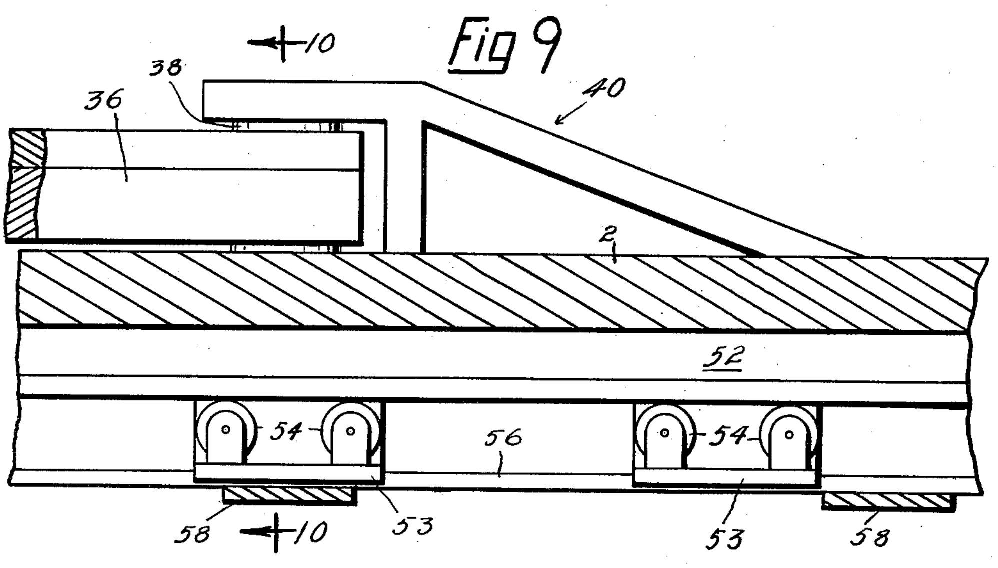
FIGURE 9 is an enlarged fragmentary sectional view taken substantially on the line 9—9 of FIGURE 3.
Figure 10:
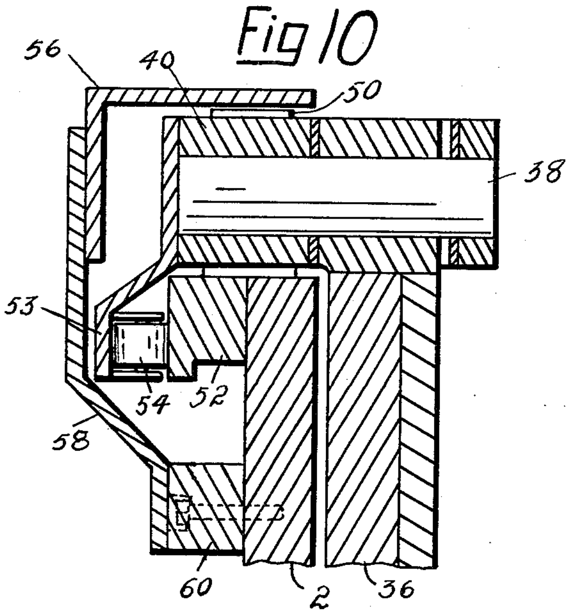
FIGURE 10 is a sectional view taken on the line 10—10 of FIGURE 9.

The bucket 30 has two arms 35 and 36 pivoted thereon adjacent to the forward end thereof. These arms extend up between the side walls 33 and 34 of the bucket and the adjacent side walls 1 and 2 of the main body of the transport. At their upper ends the arms 35 and 36 are pivoted on axles 37 and 38 of two carriers 39 and 40 that are supported on the tops of the side plates 1 and 2. The detailed construction of these carriers is shown in FIGURES 9 and 10. The carriers are moved lengthwise along the side plates 1 and 2 by roller chains 41 and 42. These chains pass around the idler sprocket wheels 43 and 44 that are mounted on the side plates 1 and 2 near the upper front corners thereof. Rearwardly of the partition wall 3 there is a bucket chain drive shaft 45 extending across the machine and jonurnalled in the side walls 1 and 2. This shaft carries drive sprocket wheels 46 and 47 for the roller chains 41 and 42. By driving the shaft 45 in one direction, the carriers 39 and 40 are moved rearwardly; and by driving the shaft in the opposite direction, the carriers are moved in the other direction.

The arms 35 and 36 have guide bars 48 and 49 thereon that overlap the curved rear edges of the side walls 33 and 34 of the bucket 30. When the arms 35 and 36 are drawn rearwardly, they lift the bucket and move it rearwardly to move the load back. When the arms 35 and 36 are driven forwardly by the carriers, they push the bucket forwardly toward digging position.

Each of the carriers 39 and 40 has a main roller 50 that rides upon the top of the corresponding side wall 1 or 2. Rails 51 and 52 are provided on the side walls and each carrier has spaced-apart guide roller units 53 depending from it with rollers 54 engaging the outer side of the rail 51 or 52. The side walls also carry cover bars 55 and 56 that overlie the carriers 39 and 40. These bars keep the carriers from rising and also protect them from rocks, etc. The bars 55 and 56 are supported by spaced brackets 57 and 58 that are carried by removable rails 59 and 60 so the cover bars can be removed readily for access to the carriers and their roller chain attachments. It has been found that when the carriers are pushing the bucket 30 forward the rollers 50 often ride up against the cover bars. Each carrier has an additional smaller roller 61 near the front which also extends above the carrier to engage the cover bar.

The mechanism just described is adequate to keep the parts that connect the upper ends of the arms 35 and 36 to the chains 41 and 42 from rising above the cover bars 55 and 56. However, this mechanism does not prevent the bucket 30 or link plate 21 from rising too high. To assure control of these parts so they cannot jump upward above the allowable height the machine is provided with a pair of hold-down members 62 and 63 having rollers 64 and 65 for engaging the bucket lip and the link plate joints. The members 62 and 63 are illustrated as roller chains, the front ends of which are mounted on the crosstie member 6 by a pair of arms 66 and 67 which have hubs 68 and 69 that fit on the member 6 and these hubs have lugs at 70 and 71 engaged with stops 72 and 73 on the side walls 1 and 2.

The members 62 and 63 extend rearwardly to a cross bar 74 that is mounted on the top of the partition wall 3. This cross bar has the members 62 and 63 pivoted to it. The bar 74 is mounted to the wall 3 by bolts 75 and 76 and spring 77 and 78. The bolts extend through the wall 3, then through the bar 74, then through the coil springs 77 and 78 and have spring caps 79 and 80 that fit on the springs. Thus the heavy springs 77 and 78 yieldingly oppose forward pull on the roller chains 62 and 63. In FIGURE 6 it is evident how the link plate 21 is held against swinging up too high by the members 62 and 63. In FIGURE 5 it is evident how the lip of the bucket 30 is held against swinging too high by these same members.

Figure 11:
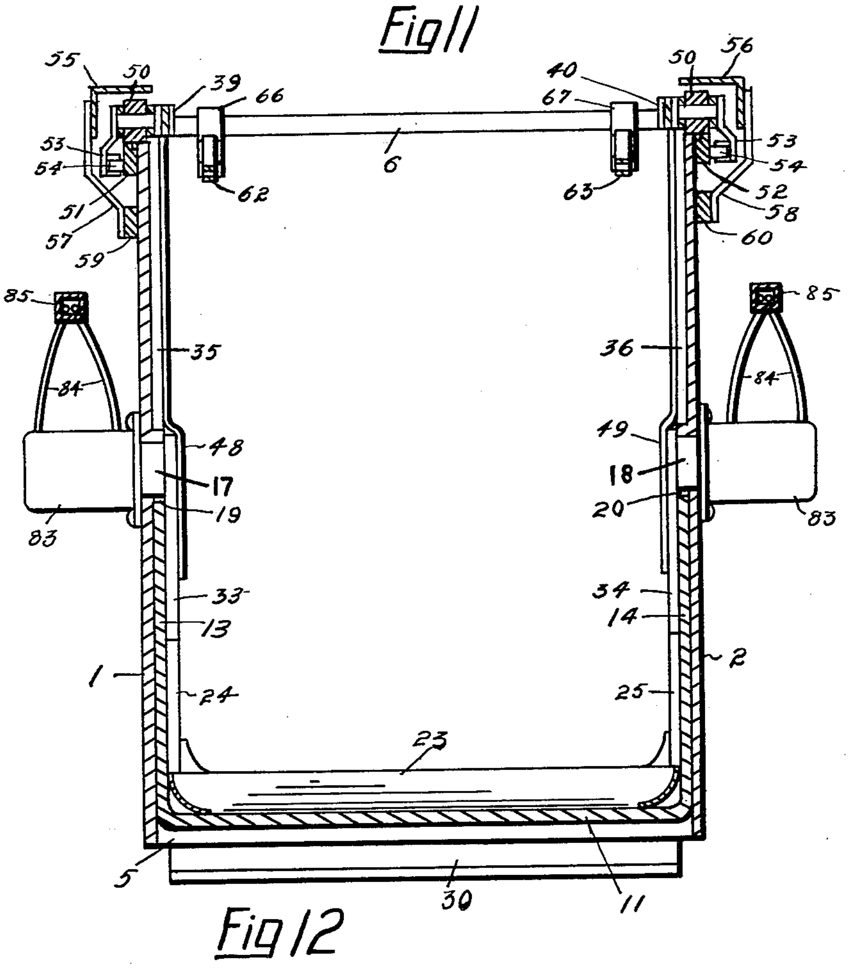
FIGURE 11 is a sectional view taken on the line 11—11 of FIGURE 3.
Figure 12:
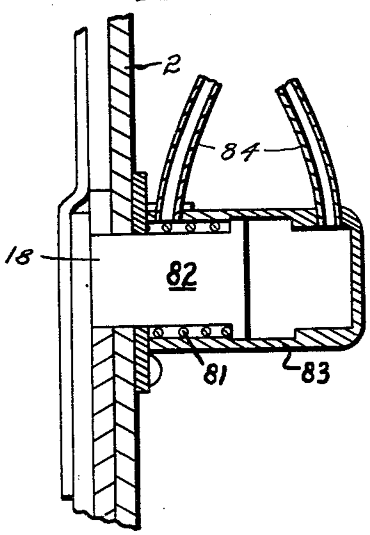
FIGURE 12 is an enlarged sectional view taken on the line 12—12 of FIGURE 3.

Referring now to FIGURES 11 and 12, these figures show the stops 17 and 18 that keep the intermediate fold-back trough member 10 from rising under forces communicated to it by the lifting of the bucket 30 and the link plate 21. Whenever these two members are loaded and the earth flows back over the front end of the member 10, this load opposes further pivoting at the hinge rods 22 and 29. The pull on the arms 35 and 36 then tends to lift the front end of the member 10 which would raise the lip of the bucket 30. So long as the stops 17 and 18 are extended into the paths of the side walls 13 and 14 of the member 10 this tendency is overcome and the members 21 and 30 must push back the load on the member 10 in order to move rearwardly. This action is best understood by reference to FIGURE 5. In effect the movement is much like pushing against the edge of a stack of sheets where the bottom sheet is held stationary. The movement of the load is greatest at the top as the members 30 and 21 are pulled rearwardly. The rearward movement of the bucket 30 is usually continued until the link plate 21 is substantially upright. The bucket 30 is at this point partially inverted. When this crowding action has been carried out to the point where the load is substantially up to the top of the partially inverted bucket, the stops 17 and 18 are then retracted and the rearward movement of the member 30 is carried further. The member 10 will then swing on its pivot 4 as described hereinbefore. The stops 17 and 18 may be retracted in any suitable manner. As shown in FIGURE 12 the retraction is by springs 81 with hydraulic fluid aid, the stops being on pistons 82 in hydraulic cylinders 83. The hydraulic fluid conduits 84 are shielded by the metal housings 85.

Figure 13:
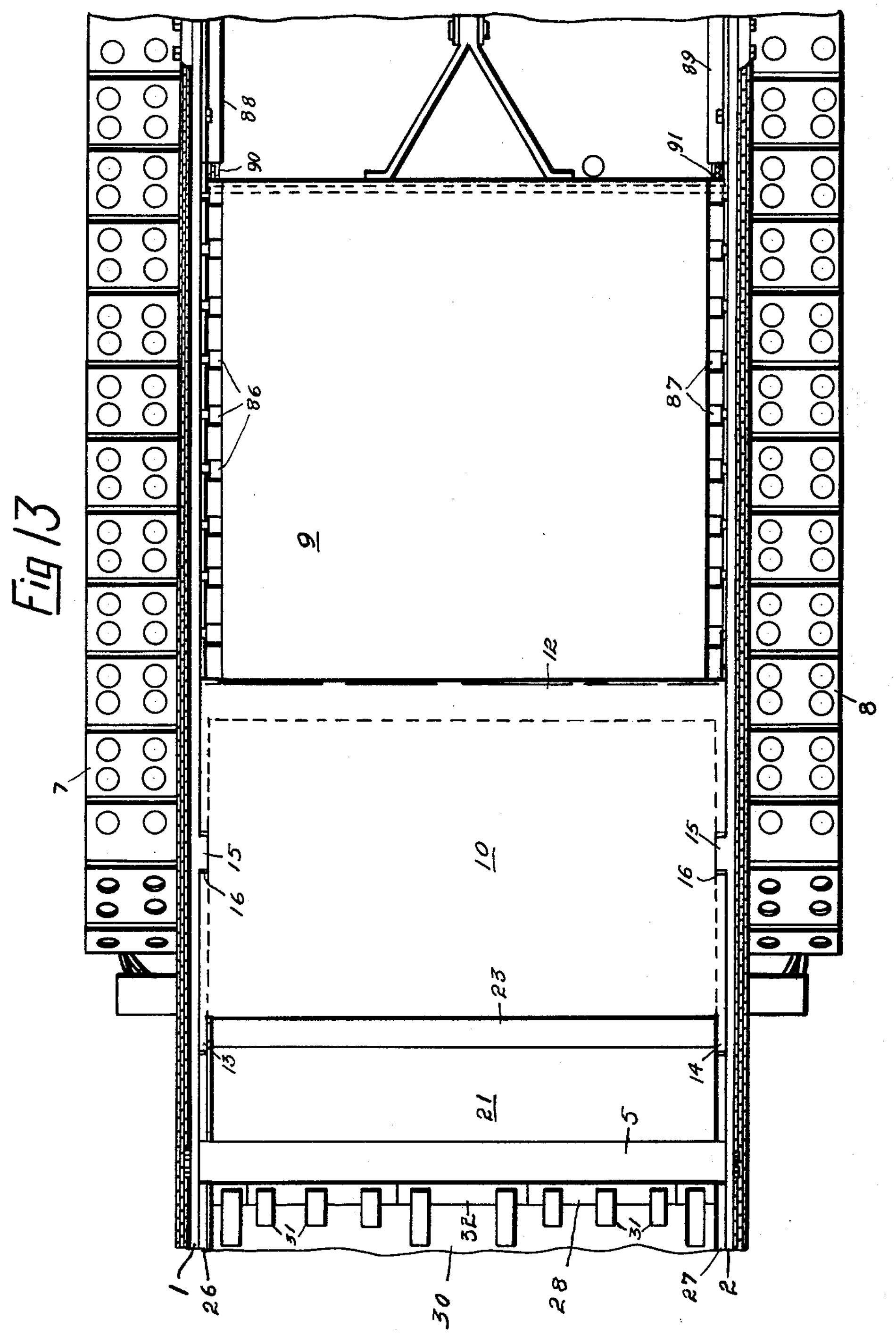
FIGURE 13 is a bottom plan view of the middle portion of the machine.
Figure 14:
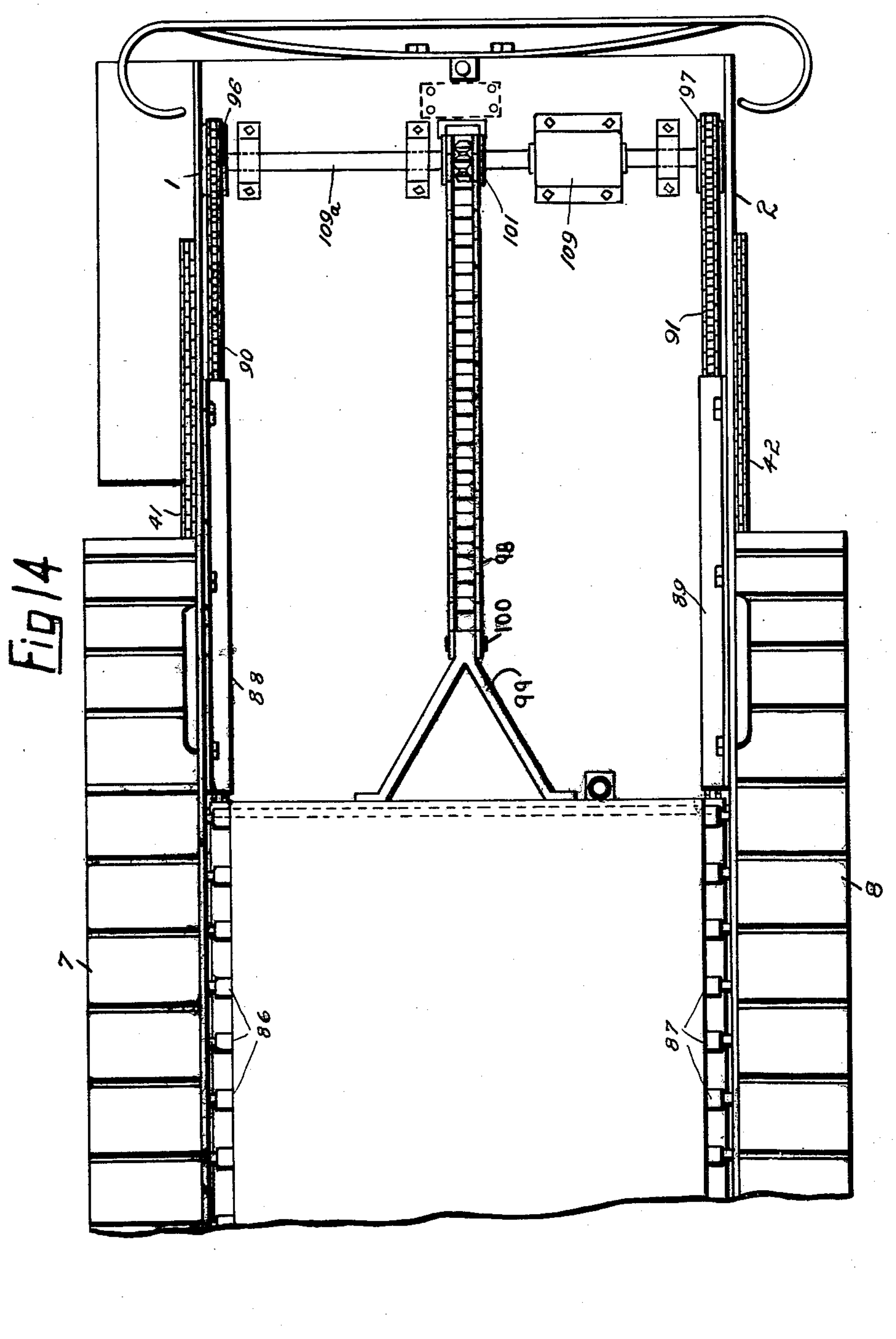
FIGURE 14 is a bottom plan view of the rear portion of the machine.
Figure 15:
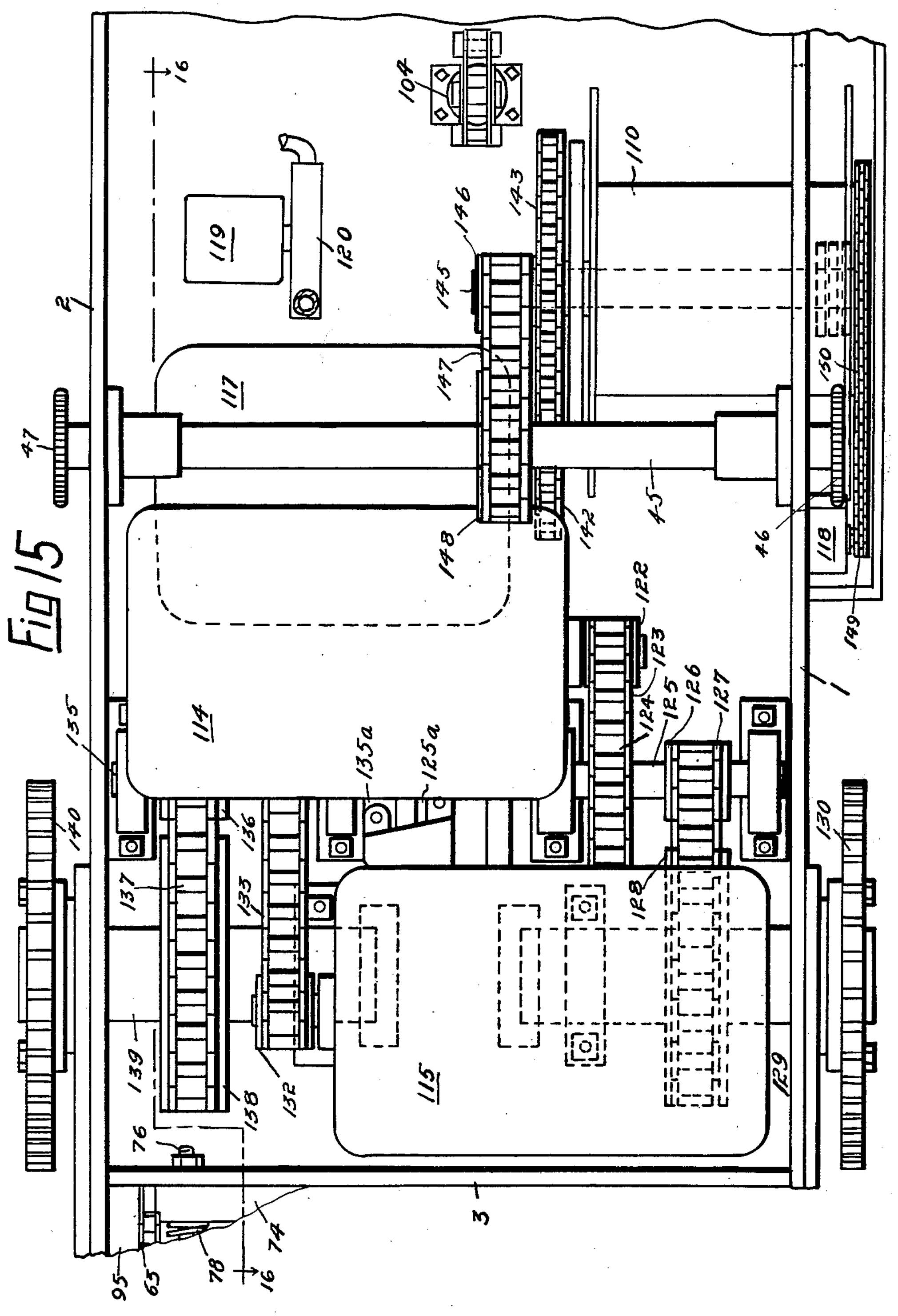
FIGURE 15 is a plan view with the cover removed of the driving mechanism in the rear of the machine.
Figure 16:
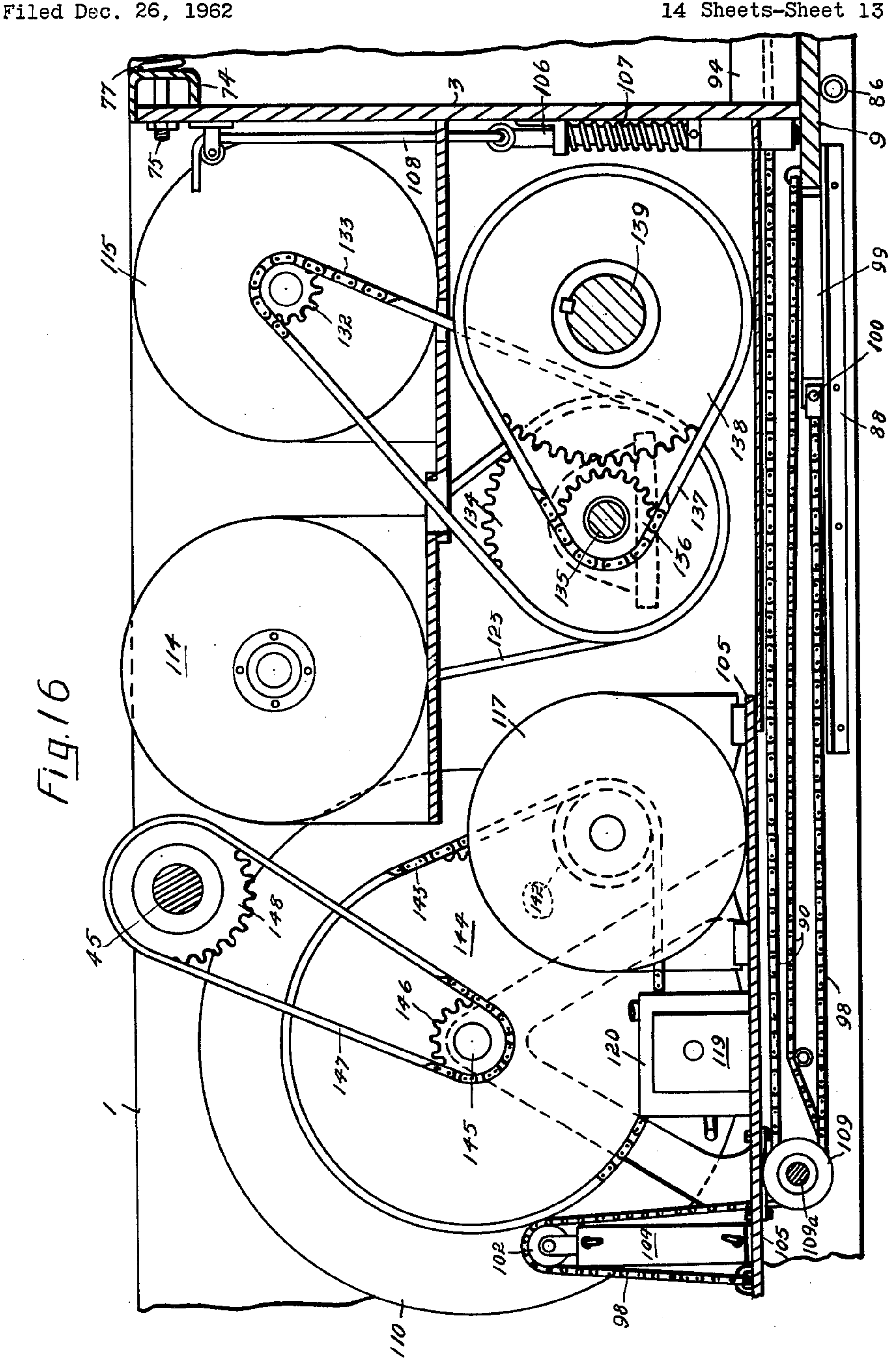
FIGURE 16 is a sectional view substantially on the line 16—16 of FIGURE 15.

The dump gate or bottom closure 9 is supported from the side walls 1 and 2 by two series of rollers 86 and 87. These rollers are spaced along the side plates from the crosstie and pivot 4 to the partition wall 3 and, rearwardly of the partition wall 3, angle iron guides 88 and 89 are provided. FIGURES 13 and 14 are bottom views illustrating how the closure 9 is carried and retracted. FIGURES 15 and 16 further illustrate the details of this structure. To pull the closure 9 forward to the position shown in FIGURE 13 two roller chains 90 and 91 are secured to the front end of the closure 9 and extend around idler rollers 92 and 93 and back over the closure 9 beneath guards 94 and 95 that are provided on the side plates 1 and 2 and around drive sprockets 96 and 97 at the rear of the transport then back to the rear end of the closure 9 where they are attached. The sprockets 96 and 97 are on a common shaft 109*a* which is powered by a suitable reversible motor 109.

When the transport is full there is a heavy load on the closure 9 making it difficult to retract. An auxiliary retraction means is provided to furnish the necessary power without making the members 90 and 91 unduly heavy. This retraction means comprises a roller chain 98 secured to the closure by a yoke 99 and a connecting pin 100. This chain 98 is passed around a rear sprocket 101 that is free to turn on the shaft 109*a*, then up over a sprocket 102 at the top of the piston rod 103 of a hydraulic jack 104 then down to the rear cross plate 105 of the transport where it is anchored. The closure 9 is pulled forward to closed position by the chains 90 and 91 and is retracted by the joint action of the jack 104 through chain 98 and the chains 90 and 91.

It is necessary to lock the closure 9 against accidental displacement when it is closed. It lies very close to the ground and may drag on a rock. A latch 106 is mounted on the partition wall 3 in position where it can be pushed down into the path of the closure 9 to prevent the closure from moving rearwardly. A spring 107 tends to urge the latch downwardly at all times so that as soon as the closure moves forward far enough the latch drops down. Manual release means 108 is provided for releasing the latch.

Figure 17:
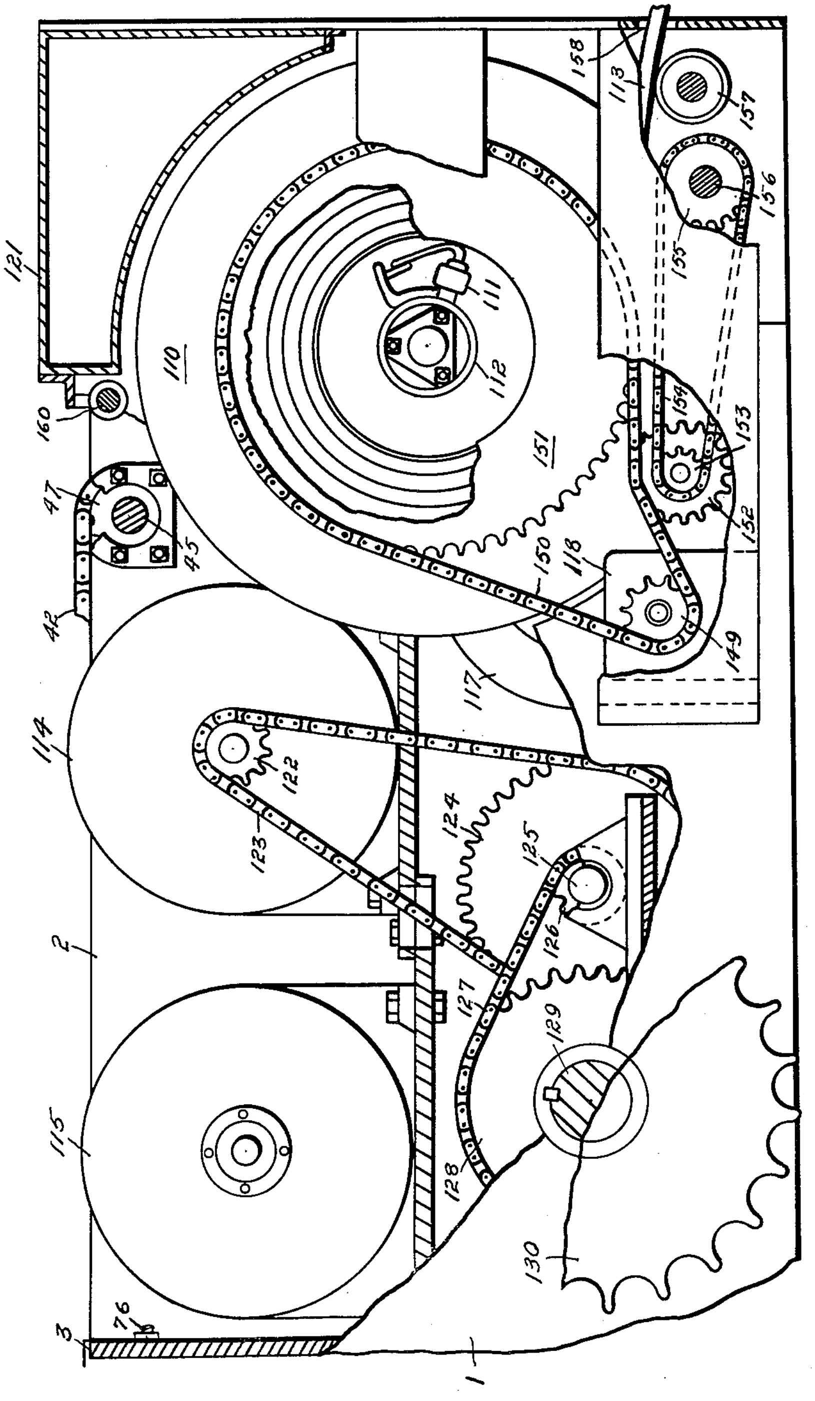
FIGURE 17 is a side view with parts broken away showing the driving mechanism at the rear of the machine.

In this machine electric power is used for the crawler tracks 7 and 8 and for the bucket chain drive shaft 45 and a pump for supplying the hydraulic fluid under pressure. Also there is a large cable drum 110 at the rear of the machine that is adapted to carry several hundred feet of power cable and reel out the cable as the machine advances from its power source into a mine tunnel or to other points of loading. This drum has brushes as indicated at 111 in FIGURE 17 and collector rings 112 for taking current from the cable 113 to conductors leading to the several motors that furnish the motive power for the machine. The specific wiring connections are not new and form no part of this invention so they will not be described in detail.

There is a motor for each crawler track, one motor 114 being connected to the crawler track 7, and another motor 115 being connected to the crawler track 8. A third motor 117 is provided for driving the shaft 45. A fourth motor 118 is provided for driving the drum 110. A small motor 119 operates a pump 120 for maintaining fluid under pressure for the two hydraulic cylinders 83 and for the closure opening hydraulic jack 104. A tank 121 holds the supply of hydraulic fluid. All of the motors are reversible motors.

The motor 114 is connected by a sprocket wheel 122 on its shaft and a chain 123 to a sprocket wheel 124 on an intermediate shaft 125. This sprocket shaft 125 has a smaller sprocket wheel 126 fixed to it. The smaller sprocket wheel 126 is connected by a chain 127 to a larger sprocket wheel 128 on a drive shaft 129 which is journalled in the side frame 1 and carries the drive sprockets 130 for the crawler track 7. It a similar manner the motor 115 is connected by a sprocket wheel 132, a chain 133, a sprocket wheel 134 on an intermediate shaft 135, a sprocket wheel 136 fixed to shaft 135, a chain 137, a larger sprocket wheel 138 to a drive shaft 139, which is journalled in the side frame 1 and carries the drive sprocket 140 for the crawler track 8. The load of the body is transferred to the crawler tracks 7 and 8 by rollers 141 which are shown in FIGURES 1 and 2 for the track 7. The intermediate shafts 125 and 135 have conventional brakes 125*a* and 135*a* thereon for holding the tracks 7 and 8 stationary.

The third motor 117 has a sprocket wheel 142 on its shaft. A chain 143 connects the wheel 142 to a large sprocket wheel 144 which is journalled on an axle 145 and which has a small sprocket wheel 146 affixed to it. The small sprocket wheel 146 drives a chain 147, that in turn drives a larger sprocket wheel 148 on the cross shaft 45 which is journalled in the side plates 1 and 2 and which carries the two sprocket wheels 46 and 47.

The motor 118 is outside the plate 1 and is provided with a sprocket wheel 149 that drives a chain 150 which in turn drves a sprocket wheel 151 fixed to the drum 110. The drum 110 is journalled on the axle 145.

The chain 150 also drives a level-wind mechanism of conventional design (not shown) for winding the electrical cable 113. This drive is through a sprocket wheel 152 that is engaged by the chain 150, a smaller sprocket wheel 153, a chain 154 to a sprocket wheel 155 on the level-wind shaft 156. The cable is run over an entrance roller 157 and through a slot 158 in the rear wall 159, of the machine. There is a rear upper cross tie rod 160 rearwardly of the shaft 45 on which the front of the hydraulic tank rides.

It is important that the angles between the members 10, 21 and 30 be prevented from becoming too acute for this would result in a nutcracker effect instead of moving the material back. The flanges 24 and 25 serve as stops for the side walls 33 and 34 of the bucket member 30, as illustrated in FIGURE 5. To limit the approach of the link plate member 21 toward the trough member 10, the side walls 13 and 14 of the member 10 have lug stops 161 thereon in position to be engaged by the flanges 24 and 25.

When the members 10, 21 and 30 approach the position shown in FIGURE 6, the member 10 tends to go further rearward. To prevent this lug stops 162 are provided on the side walls 1 and 2. There is also a tendency for the members 21 and 30 to sag at their connection as far as the stop lugs 31 will permit. To prevent the bucket member 30 from dropping too far, the side walls 1 and 2 are provided with supports 163 for the arms 35 and 36 and below these supports 163 there are lug stops 164 on the side walls 1 and 2 which extend inwardly far enough to be in the paths of the bucket side walls 33 and 34. These stops and supports keep the members 10, 21 and 30 in proper position so that when the arms 35 and 36 are moved forward they will move the members 30, 21 and 10 smoothly forward to loading position. The hold down members 62 and 63 keep the connection at the hinge rod 29 from rising until the member 10 moves far enough forward to shift its weight forward of the cross tie 4. Beyond that point the weight of the trough member 10 aids in the forward movement of the members 10, 21 and 30.

It is believed that the nature and advantages of the invention will be apparent from the foregoing description.

The following claims define the invention:

1. A self loading transport comprising:
- a pair of upstanding elongated transversely spaced side walls;
- an upright transverse partition wall intermediate the ends of said side walls and fixed thereto dividing the space between said side walls into a forward load receiving space and a rear power equipment receiving space;
- a cross tie means connected to said side walls at their forward ends near the top thereof;
- a second cross tie means connected to said side walls at their lower edges and spaced forwardly from said partition wall to provide a bottom discharge opening between the partition wall and said second cross tie means;
- a closure for said discharge opening mounted on the side walls for movement lengthwise of the transport between a position closing said opening and a position rearwardly of said partition;
- an intermediate fold back trough pivoted to the side walls at the front of the discharge opening to swing up into the space between said side walls;
- a digging bucket carried by the front lower edge of the trough and swingable upwardly over the trough to load it;
- means to swing said bucket upwardly and rearwardly over the trough and operable to pull the bucket rearwardly over the trough to swing the trough upwardly;
- the trough and the bucket being spaced apart by a short link plate that is pivoted to both of them and that extends transversely from one side wall to the other; and
- a third cross tie means beneath said link plate to keep it from swinging below the side walls.

2. A self loading transport including a load receiving body having upstanding spaced apart side walls, a rear wall and bottom wall provided with a dump opening and a closure therefor;
- said transport having a U-shaped trough pivoted at its lower rear edge to said body at a point in front of said opening and rotatable about its pivot from a horizontal, load receiving position upwardly and rearwardly between said side walls to crowd material thereon into the body;
- said transport also having a trough like bucket between said side walls forwardly of said trough;
- a link plate pivotally connected to the lower front edge of the trough and to the lower rear edge of the bucket and spacing said edges from each other, the link plate being swingable upwardly and rearwardly over the trough;

- stop means on the trough and plate engageable by rearward swinging of the link plate to keep the included angle between the plate and trough about 90 degrees at all times;
- power means operably connected to the bucket for moving it upwardly and rearwardly over the trough;
- stop means on the side walls engageable by the trough to limit downward movement of the trough; and
- manually releasable stop means on the side walls normally holding the trough in its lowermost position.

3. The device defined in claim 2 wherein said bucket is movable by the power means rearwardly beyond the trough upon release of said manually releasable stop means and upward swinging of the trough.

4. The device defined in claim 2 with stop means on the side walls rearwardly of the trough operable to prevent downward movement of the bucket in its rearmost position.

5. In a self loading transport including a load receiving body having upstanding spaced apart side walls, a rear wall and a bottom dump opening adjacent to said rear wall with a closure for said opening carried by the side walls, a mechanism for picking up and moving loose aggregate rearwardly between said walls over said closure, said mechanism comprising:
- a trough member spanning the space between said side walls and having a rear end pivotally supported by said side walls at the front edge of said opening;
- means on the side walls limiting downward movement of said trough member to the space between the side walls;
- a link plate member pivoted on the front end of said trough member and spanning the space between the side walls in front of said trough member;
- a bucket member pivoted on the front of the link plate and extending forwardly;
- means on the side walls to swing the bucket member and link member over the trough member and thereby force aggregate rearwardly on the trough member, said means being operable to move the bucket member and link plate member further rearwardly whereby to lift the trough member to upright position between the side walls about its rear pivotal support and to push the bucket member and link plate forwardly thereby to return the plate and bucket to a forward position in front of the trough member, said members having interengaging stop means limiting the angular approach of each member to the adjacent member.

6. A self loading transport including a load receiving body having upstanding spaced apart side walls, a rear wall and bottom wall provided with a dump opening and a closure therefor;
- said transport having a U-shaped trough pivoted at its lower rear edge to said body at a point in front of said opening and rotatable about its pivot from a horizontal, load receiving position upwardly and rearwardly between said side walls to crowd material thereon into the body;
- said transport also having a trough like bucket between said side walls forwardly of said trough;
- a link plate interposed between the trough and bucket and pivoted thereto and connecting the lower rear edge of the bucket to the lower front edge of the trough for swinging movement of the bucket upwardly and rearwardly over the trough;
- said side walls having means thereon to limit the downward swinging movement of the link plate;
- said link plate having means thereon to limit the downward swinging movement of the bucket relative to the link plate;
- arms pivoted to the bucket forwardly of said connecting means and extending upwardly along the side walls of the body and supported at their upper ends on said side walls for movement lengthwise of the side walls to swing the bucket from a position forwardly of the trough over the trough and rearwardly to lift the trough about its pivot to said body; and manually releasable means on the side walls engaging said trough to prevent lifting thereof by swinging the bucket.

7. A self loading transport including a load receiving body having upstanding spaced apart side walls, a rear wall and bottom wall provided with a dump opening and a closure therefor;

said transport having a U-shaped trough pivoted at its lower rear edge to said body at a point in front of said opening and rotatable about its pivot from a horizontal, load receiving position upwardly and rearwardly between said side walls to crowd material thereon into the body;

said transport also having a trough like bucket between said side walls forwardly of said trough;

a link plate filling the gap between the trough and the bucket and pivoted to the lower front edge of the trough and the lower rear edge of the bucket;

said link plate having stop means thereon engageable by the bucket bottom to limit downward swinging movement of the bucket thereon;

arms pivoted to the bucket forwardly of said connecting means and extending upwardly along the side walls of the body and supported at their upper ends on said side walls for movement lengthwise of the side walls to swing the bucket from a position forwardly of the trough over the trough and rearwardly to lift the trough about its pivot to said body; and manually releasable means on the side walls engaging said trough to prevent lifting thereof by swinging the bucket.

8. A self loading transport including a load receiving body having upstanding spaced apart side walls, a rear wall and bottom wall provided with a dump opening and a closure therefor;

said transport having a U-shaped trough pivoted at its lower rear edge to said body at a point in front of said opening and rotatable about its pivot from a horizontal, load receiving position upwardly and rearwardly between said side walls to crowd material thereon into the body;

said transport also having a trough like bucket between said side walls forwardly of said trough;

means connecting the lower rear edge of the bucket to the lower front edge of the trough for swinging movement of the bucket upwardly and rearwardly of the trough;

arms pivoted to the bucket forwardly of said connecting means and extending upwardly along the side walls of the body and supported at their upper ends on said side walls for movement lengthwise of the side walls to swing the bucket from a position forwardly of the trough over the trough and rearwardly to lift the trough about its pivot to said body;

carriers riding on the side walls pivotally supporting said arms;

said carriers having top rollers riding on the top edges of the side walls, and side guide rollers riding on the outer faces of the side walls;

cover bars carried by the side walls overlying the carriers and limiting upward movement thereof;

means to move said carrier to and fro along the side walls;

hold down members extending alongside each of the side walls and between them and having ends fixed with respect to the respective side wall, said hold down members cooperating with the bucket to keep it down in the space between said side walls during fore and aft movement of the bucket.

References Cited by the Examiner

UNITED STATES PATENTS

| | | | |
|---|---|---|---|
| 2,953,263 | 9/60 | Hayes | 214—78 |
| 3,056,520 | 10/62 | Rutigliano | 214—505 |

HUGO O. SCHULZ, *Primary Examiner.*

GERALD M. FORLENZA, *Examiner.*